(12) United States Patent
Kress et al.

(10) Patent No.: US 6,708,442 B2
(45) Date of Patent: Mar. 23, 2004

(54) HOOD FOR ARTIFICIAL LURE AND BAITFISH

(75) Inventors: James H. Kress, Satellite Beach, FL (US); Jerry N. Spaulding, Largo, FL (US)

(73) Assignee: L & S Bait Company of Florida, Inc., Largo, FL (US)

( * ) Notice: Subject to any disclaimer, the term of this patent is extended or adjusted under 35 U.S.C. 154(b) by 0 days.

(21) Appl. No.: 10/200,663

(22) Filed: Jul. 22, 2002

(65) Prior Publication Data

US 2004/0010959 A1 Jan. 22, 2004

(51) Int. Cl.$^7$ .................................. A01K 83/06
(52) U.S. Cl. ..................... 43/44.4; 43/44.2; 43/44.9
(58) Field of Search ............................. 43/44.4, 44.9, 43/44.2, 42.36

(56) References Cited

U.S. PATENT DOCUMENTS

| | | | |
|---|---|---|---|
| 1,246,150 A | * | 11/1917 | Parr ........................... 43/44.4 |
| 2,763,086 A | * | 9/1956 | Johnson et al. .............. 43/44.2 |
| 3,760,529 A | * | 9/1973 | Hicks ........................... 43/41 |
| 3,893,255 A | * | 7/1975 | Hicks ........................... 43/41 |
| 4,163,337 A | * | 8/1979 | Kress ......................... 43/42.5 |
| 4,848,023 A | * | 7/1989 | Ryder et al. ................ 43/44.2 |
| 4,932,154 A | * | 6/1990 | Andreetti ................... 43/44.6 |
| 5,207,016 A | * | 5/1993 | Pate .......................... 43/42.28 |
| 5,377,442 A | * | 1/1995 | Gariglio .................... 43/44.4 |
| 5,533,296 A | * | 7/1996 | Jansen ...................... 43/42.36 |
| 5,778,593 A | * | 7/1998 | Baron .......................... 43/41 |

* cited by examiner

Primary Examiner—Charles T. Jordan
Assistant Examiner—Bret Hayes
(74) Attorney, Agent, or Firm—John L. DeAngelis, Jr.; Beusse Brownlee Wolter Mora & Maire, P.A.

(57) ABSTRACT

A reflective hood for use with a natural baitfish or artificial lure baitfish. The baitfish is received within the hood, which is shaped to resemble a baitfish head and further includes two eyes. The fishing line with a hook attached passes through a hole in the front or nose portion of the hood and passes into the body of the baitfish, with the hook extending from the baitfish in the mid-body region.

11 Claims, 4 Drawing Sheets

HOOD FOR ARTIFICIAL LURE AND BAITFISH

FIELD OF THE INVENTION

The present invention is related generally to a fishing lure and more specifically to a fishing lure hood for placement over the head of a baitfish or an artificial lure.

BACKGROUND OF THE INVENTION

Anglers are continually in search of a better lure to attract fish to the hook, thereby resulting in more frequent strikes and an increase in the catch. Most artificial lures are designed to resemble baitfish, and typically include shiny and reflective patterns and colors and moving surfaces to attract the fish. Some lures also include life-like eyes, scales and gills. Fish hooks can be attached to the artificial lure at the tail and the mid-body area. One disadvantage of the artificial lure is the tendency of the lure to float at the water surface, since it weighs less than the water volume it displaces. While floating on the top, the lure tends to skip across the water surface as it is trolled forward, rather than appearing to swim through the water. Such unnatural motions are sensed by the fish and therefore reduce the likelihood of a strike. To remedy this situation, at least to some extent, the forward trolling speed can be decreased. But decreasing the speed increases the time required to troll through a given area in search of a school of hungry fish.

Also, as a lure is trolled through the water it tends to flop over onto one side or the other, causing the lure to "swim" through the water on a side surface rather than on its belly. This is especially problematic for light lures. Like the skipping lure described above, the unnatural orientation of the lure moving through the water on its side can be sensed by the fish and it may not be attracted to the lure.

Fishing with natural baitfish, such as ballyhoo and mullet, may also result in some of the same problems discussed above for artificial lures. In addition, trolling natural baitfish through the water causes washout, i.e., deterioration of the baitfish due to forces exerted by the water against the baitfish as it moves forward through the water. To keep the baitfish under the water surface, anglers are known to tie a wire around the mouth of the baitfish and hang a weight from the wire.

BRIEF SUMMARY OF THE INVENTION

To overcome certain disadvantages associated with the use of artificial lures and natural baitfish, a hood, in accordance with the teachings of the present invention, is placed over the head of the baitfish. The fishing line, with the hook attached, passes through an opening in the front surface of the hood and into the body of the baitfish, with the hook exiting the baitfish along the bottom surface in the mid-body region. The hood further comprises a weight-receiving recess in the interior bottom surface thereof. A weight placed therein exerts a downward force on the baitfish to hold the bait in an upright position below the surface of the water. Thus the baitfish appears to be swimming through the water. Trolling of the baitfish may also cause a back and forth movement of its tail, resembling a swimming fish. The hood advantageously reduces washout of natural baitfish, prolonging its effective use by the angler. The trolling speed can also be increased since the hood protects the baitfish against washout, thereby allowing the angler to cover a greater area in less time at a higher trolling speed.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
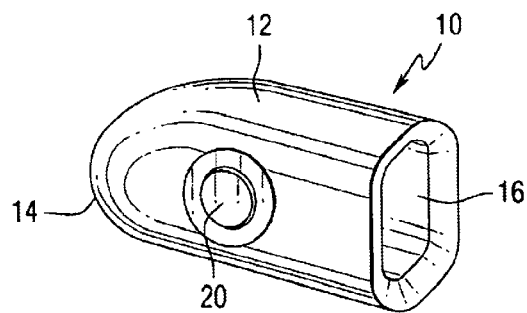
FIGS. 1 and 2 are perspective views of a baitfish hood constructed according to the teachings of the present invention.

Before describing in detail the particular lure hood in accordance with the present invention, it should be observed that the present invention resides primarily in a novel combination of hardware elements related thereto. Accordingly, the hardware elements have been represented by conventional elements in the drawings, showing only those specific details that are pertinent to the present invention, so as not to obscure the disclosure with structural details that will be readily apparent to those skilled in the art having the benefit of the description herein.

FIG. 1 is a perspective view of a hood 10 constructed according to the teachings of the present invention, comprising an elongated body 12 terminating in a nose 14. The elongated body 12 defines a hollow interior 16. The hood is generally shaped to resemble the head of a baitfish. In one embodiment, the hood 10 is constructed from a highly-reflective material, such as chrome, such that sunlight is reflected off the hood 10 to produce an attractive flash visible to fish swimming in the area. In yet another embodiment, the hood comprises two realistic (i.e., formed to appear three-dimensional) eyes 20 (only one of which is shown in FIG. 1) oriented on opposite sides of the hood 10 and received within a circumferential recess formed in the surface of the elongated body 12. The eyes can be reflective and colored to attract the attention of the fish.

Figure 2:
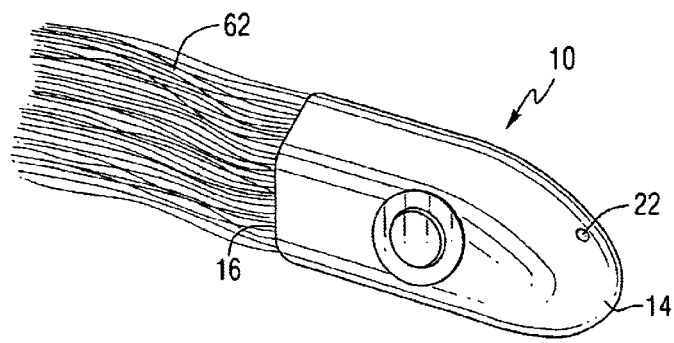
Figure 3:
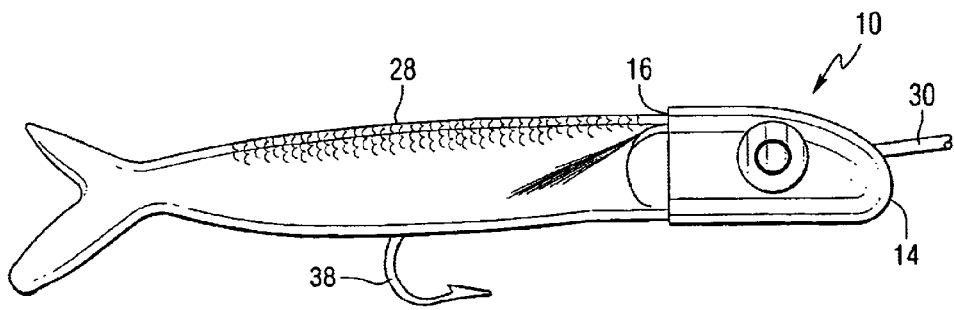
FIG. 3 illustrates the hood mated with a baitfish.
Figure 4:
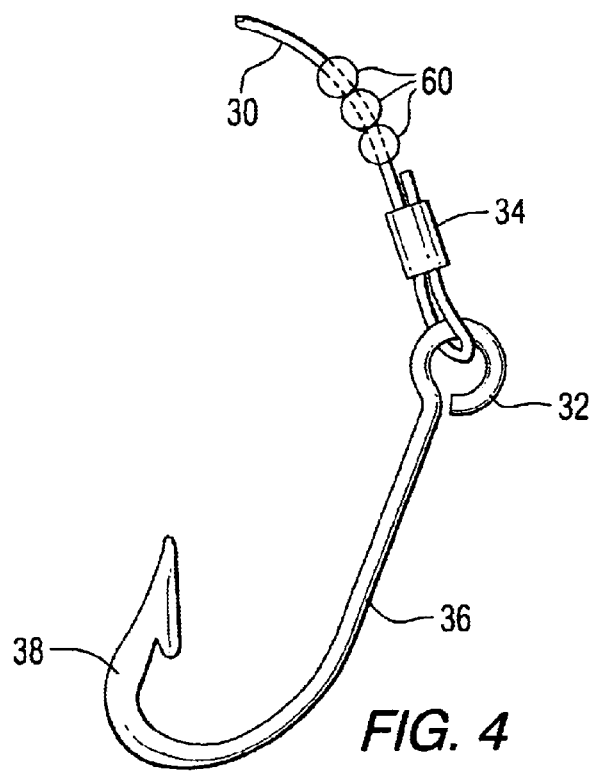
FIG. 4 illustrates a hook for use with the hood of the present invention.

FIG. 2 is a second perspective view of the hood 10, from a different viewing angle than FIG. 1. This view illustrates an opening 22 for receiving a fishing line and an attached hook. FIG. 3 illustrates the hood 10 mated with a baitfish 28 (where the baitfish 28 represents either a natural baitfish or an artificial lure) such that the head thereof is received within the hollow interior 16. A line 30 passes through the opening 22 and into the hollow interior 16, where the free end passes through an eyelet 32. See FIG. 4. The free end is then crimped to a segment of the line 30 to form a joint 34. The eyelet 32 is an extension of a hook shank 36 formed into a closed curve, and the hook 38 is formed at the opposing end of the hook sank 36. Typically, the line 30 comprises a monofilament line or a wire line.

Returning to FIG. 3, the hook 38 is inserted into the baitfish 28 along the front surface thereof, such that the hook shank 36 is embedded within the baitfish body and the hook 38 protrudes therefrom as shown. The hood 10 can be used with any baitfish 28. In particular, the hood 10 is used with mullet and ballyhoo for catching mackerel, dolphin, tuna and wahoo. Using the teachings of the present invention, various size hoods can be constructed for use with other baitfish.

Figure 5:
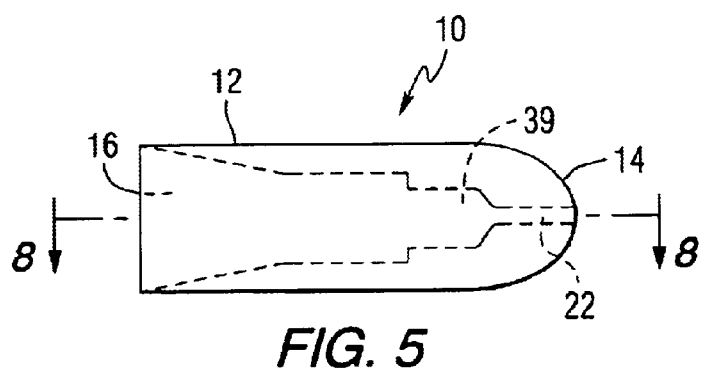
FIGS. 5, 6 and 7 are top, front and side views, respectively, of the hood.
Figure 6:
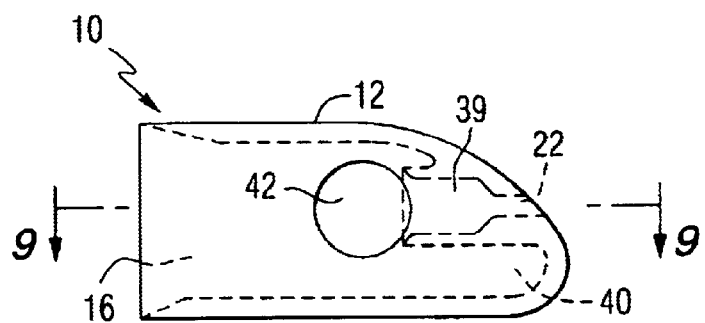
Figure 7:
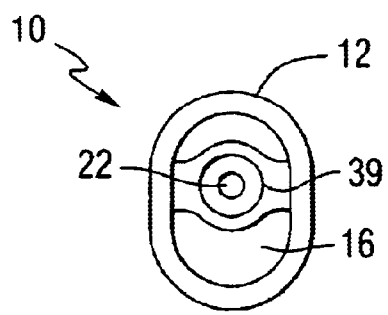

FIGS. 5 and 6 are top and side views, respectively, of the hood 10. It can be seen that the interior 16 includes a receiving region 39 for receiving a cone to be described below. Also, a weight receiving recess 40 and an eye receiving recess 42 are both illustrated in FIG. 6. In one embodiment, the hood 10 is approximately 2.125 inches long and 1.125 inches high. The length from the rear surface of the hood 10 to the receiving region 39 is about 1.5 inches. Any or all of these dimensions can be increased or decreased as required to accept larger or smaller baitfish or lures within the hood 10. Generally, the wall surfaces of the hood 10 are about 0.15 inches thick, thinning to about 0.10 inches in the region of the nose 14 and along the top and bottom surfaces. FIG. 7 is an end view of the hood 10. The hood 10 in one embodiment is about 0.8 inches wide.

Figure 8:
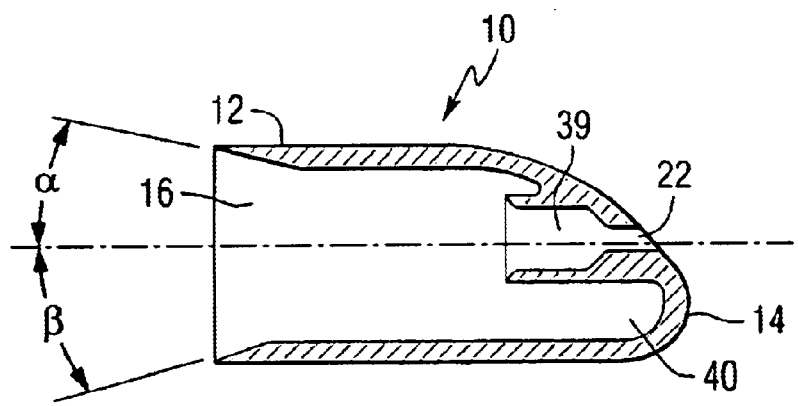
FIGS. 8 and 9 are cross-sectional views of the hood.
Figure 9:
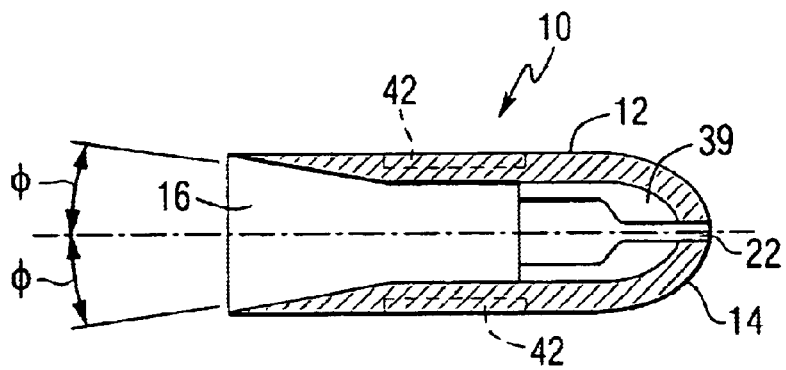

FIG. 8 is a cross-sectional view along the line 8—8 of FIG. 5. FIG. 9 is a cross-sectional view along the line 9—9 of FIG. 6. In one embodiment, the angle $\alpha$ in FIG. 8 is about 12° and the angle $\beta$ is about 15°. In FIG. 9, the angles $\phi$ are each about 8°. It is recognized that these angles can be changed as required to accommodate differently sized lures and baitfish.

Figure 10:
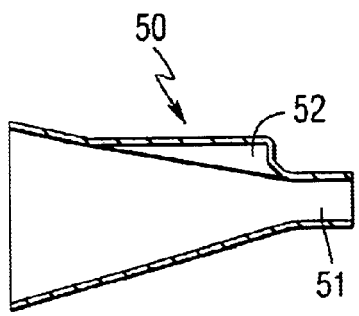
FIG. 10 illustrates a cone for use with the hood of the present invention.

FIG. 10 illustrates a side view of a cone 50, that is received within the interior 16, such that a protrusion 51 is received within the receiving region 39. See the cross-sectional view of FIG. 11, which is a cross-section along the plane 8—8 of FIG. 5, with the cone 50 received within the interior 16.

Figure 12:
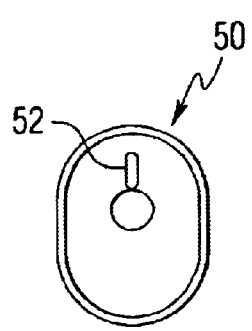
FIG. 12 is an end view of the hood with the cone of FIG. 10 received therein.

FIG. 12 illustrates a rear view of the hood 10 including the cone 50 having a slot 52 for frictionally engaging a wire pin on wire rigs. When rigging certain baitfish, ballyhoo for example, the angler wraps a length of wire around the hook shank 36, directs the wire free end into the bottom surface of the jaw and then turns it upwardly until it protrudes from the jaw top surface. The hook 38 protrudes from the bottom surface of the baitfish as illustrated in FIG. 3. This protruding wire segment is referred to as a pin and is frictionally engaged within the slot 52 for holding the baitfish in the hood 10. In lieu of the wire pin, a toothpick can be inserted into the baitfish mouth, with a segment protruding from the opening 22. Notwithstanding the use of a pin as described above, the baitfish 28 will remain captured within the hood 10 due to the force exerted by the line 30 against the hood 10 when the hook 38 is embedded within the baitfish 28.

Figure 11:
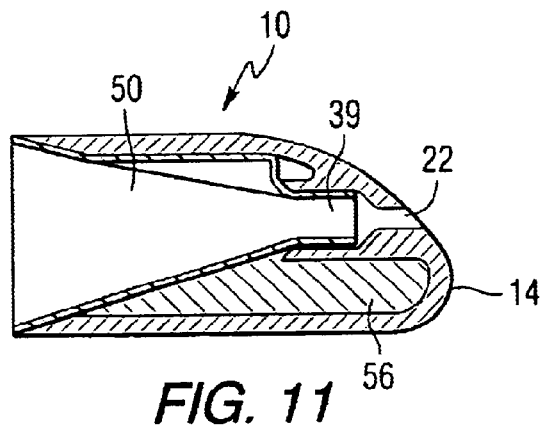
FIG. 11 is a cross-sectional view of the hood with the cone of FIG. 10 received therein.

The cone 50, in one embodiment constructed of plastic, is received within and frictionally engaged by the receiving region 39 as shown in FIG. 11. The cone 50 can also be secured to the hollow interior 16 by use of an adhesive or a thermosetting fusion process. The head of the baitfish 28 is received within the cone 50. FIG. 11 also illustrates a weight 56, typically formed from lead, received within the weight receiving recess 40 and held in place by the cone 50. Use of the weight 56 submerges the hood 10 and attached baitfish 28 about 4 to 8 inches below the surface of the water at trolling speeds to about 14 knots. As is known, according to the prior art natural baitfish are typically trolled at about 6 or 7 knots to avoid washout of the baitfish. But the lower trolling speeds require more time for the angler to cover an area in search of fish.

The hood 10 can also be used without the baitfish 28 by placing a plurality of beads on the line 30 forward of the hook 38. The beads will thus prevent the hook 38 from being captured within the hood 10. A sufficient number of beads are threaded onto the line 30 such that the hook 38 protrudes about three inches from the hood 10 for striking by a fish. In this embodiment the hood 10 can further include colored fiber skirts (constructed of nylon in one embodiment) extending rearwardly from the hood 10. The natural motion of the skirt material in the water attracts the fish. The embodiment of the hood 10 with the colored skirts can also be used with a baitfish 28, wherein the skirt material serves to attract for the fish.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. For example, different sized and shaped baitfish and artificial lures can be accommodated by appropriate size and shape modifications to the hood constructed according to the teachings of the present invention. Therefore, it is intended that the invention not be limited to the particular embodiment disclosed as the best mode contemplated for carrying out this invention, but that the invention will include all embodiments falling within the scope of the appended claims.

What is claimed is:

1. A hood for use with a baitfish, comprising:
  a body having generally elongated shape and defining a hollow interior and a recess disposed on a bottom interior surface;
  a weight disposed within the recess, wherein said weight exerts a downwardly directed force on the baitfish when the baitfish is captured within said body;
  a hollow cone received within the hollow interior for receiving a head of the baitfish there within.

2. The hood of claim 1 wherein the baitfish is a natural baitfish or an artificial lure.

3. The hood of claim 1 wherein the outside surface of the body is formed from a highly reflective material.

4. The hood of claim 1 wherein the outside surface of the body is formed with a chrome finish.

5. The hood of claim 1 further comprising an artificial eye disposed in opposing sides of the body.

6. The hood of claim 5, wherein the body defines an opening in the nose portion for receiving a fishing line affixed to a hook, wherein the fishing line extends into the baitfish and the hook protrudes from the baitfish.

7. The hood of claim 1, wherein said cone includes a slot in the top surface thereof for receiving a pin protruding upwardly from the baitfish.

8. The hood of claim 1 further comprising a skirt of fiber material attached to the body.

9. The hood of claim 8 wherein the fiber material is formed in various colors.

10. A hood for use as a fishing lure, comprising:
  a body having a generally elongated shape, a nose portion at the forward end thereof and defining a hollow interior and a recess disposed in a bottom interior surface;
  a weight disposed within the recess for exerting a downwardly directed force on said hood;
  wherein said nose portion defines a opening therein for receiving a fishing line having a hook attached thereto, wherein the hook extends rearwardly from said body; and
  a hollow cone received within the hollow interior for restraining said weight within the recess.

11. The hood of claim 10 wherein the hook is separated from the hood by one or more spacers threaded on the fishing line.

\* \* \* \* \*